(12) United States Patent
Stobbe

(10) Patent No.: US 6,275,143 B1
(45) Date of Patent: *Aug. 14, 2001

(54) SECURITY DEVICE HAVING WIRELESS ENERGY TRANSMISSION

(76) Inventor: Anatoli Stobbe, Steinradweg 3, D-30890 Barsinghausen (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/075,035

(22) Filed: May 8, 1998

(51) Int. Cl.$^7$ ........................................................ H04Q 1/00
(52) U.S. Cl. ................ 340/10.34; 340/5.61; 320/108; 320/20
(58) Field of Search ................ 340/825.72, 825.69, 340/825.31, 572; 320/20, 108; 455/343

(56) References Cited

U.S. PATENT DOCUMENTS

| | | | |
|---|---|---|---|
| 4,829,296 | * 5/1989 | Clark et al. | 340/825.31 |
| 5,300,875 | * 4/1994 | Tuttle | 320/20 |
| 5,850,181 | * 12/1998 | Heinrich et al. | 340/572 |

FOREIGN PATENT DOCUMENTS

34003410C2    4/1992 (DE).

* cited by examiner

Primary Examiner—Brian Zimmerman
(74) Attorney, Agent, or Firm—Collard & Roe, P.C.

(57) ABSTRACT

A device for wireless energy transmission and preparing of a remote actuator wherein energy is transmitted from a transmitting device to a receiving device coupled to the actuator. Mechanical and/or electrical movements are executed by the receiving device in response to a coded data transmission. The energy transmitted from the transmitting device to the receiving device serves to supply an actuator executing the mechanical and/or electrical action with energy. The actuator is tripped, remotely controlled by the transmitting device, or automatically by at least one sensor of the receiving device.

19 Claims, 3 Drawing Sheets

SECURITY DEVICE HAVING WIRELESS ENERGY TRANSMISSION

BACKGROUND OF THE INVENTION

1. Field of the Invention

The invention relates to a security device that has wireless energy transmission. More specifically, this invention relates to a wireless energy system that transmits wireless energy to a receiving system which uses that received energy to actuate an electromechanical device.

2. Description of the Prior Art

Small household appliances and electric tools have been known to transmit energy wirelessly. In these devices, a voltage is induced via an A-C power primary coil of a charging station to a secondary coil integrated in the appliance. The secondary coil serves as a charger for a storage battery connected to the appliance. To charge the battery, it is placed in a charging station, so that the secondary coil is inductively coupled with the primary coil to charge the battery.

Wireless energy transmission and the transmission of data is known from transponder systems shown in German Patent No. DE-PS 4,003,410 C2, where a base station can be coupled to one or more transponders. The base station comprises at least one high-frequency transmitter, which may be both an energy transmitter at the same time, and a data transmitter. The transponder comprises an HF-receiver, which may be both an energy receiver and a data receiver. The transponder may be equipped without its own energy source because it receives the energy from the base station. As a rule, transponder systems also have a data transmission circuit in the reverse direction. A transmitter or modulator is located in the transponder and a receiver is located in the base station. In these systems, the base station may be equipped with an actuator in the form of a lock or an opener. The actuator can be actuated within the framework of an access control system when a transponder, equipped with an access authorization code is introduced in the field of the base station. If the code matches, the lock opens. These base stations are always equipped with their own energy source, which is connected to an AC power source. However, battery operated systems are also available.

Furthermore, there are also remote control systems. These systems consist of a transmitter and a receiver, whereby the receiving device is coupled with an active element. With these systems, data is transmitted only to the receiving device. However, the receiving device and any evaluation electronics that are present are supplied with energy from their own batteries or by an accumulator storage battery.

SUMMARY OF THE INVENTION

The invention is based upon improving a device for wireless energy transmission so that the receiving device is fully operational without its own energy source.

The invention relates to an energy supply for the receiving device and the actuator executing the mechanical and electrical operation action. The energy is transmitted from the transmitting device to the receiving device. Therefore, since the receiving device is capable of being operated continuously, entirely free of maintenance, there is no exhaustion of any energy source. Any action of the actuator within this receiving device can be controlled and therefore influenced specifically. Therefore apart from the event of energy transmission as one criterion there is an additional criterion of control representing a safety against tampering attempts or unintentional tripping.

An action in the receiver can be tripped in many different ways. For example, the actuator can be tripped by remote control from the transmitting device. In addition, automatic tripping of the receiving device can be achieved by means of a sensor. A further possibility is the triggering of the action after comparing a code transmitted by the transmitter with a code stored in the receiving device. Furthermore, tripping may occur upon the authentication of data exchanged between the transmitting device and the receiving device. These additional security devices insure that one additional criterion or a plurality of additional criterion are tested before the action is tripped, so that there is increased safety available against unintentional tripping or unwanted break-ins.

If there are several actuator elements present, the action may trip according to the individual design of each actuator.

The receiving device may comprise a temporary energy storage, which is chargeable by transmitted energy from the transmitting device to the receiving device. The temporary energy storage can supply the receiving device with energy during transmission breaks or during peak consumption.

Thus, the receiving device remains independent of stability and amount of energy transmission. In this way, an electronic circuit is capable of continuously operating over a limited period of time, or an actuator can be used which, for a short time, requires more power than can be transmitted by the transmitting device to the receiving device. The actuators may be for example, solenoids, electromagnets or motors.

The RF sensor of the receiving device may be a frequency detector and a voltage-value detector for the energy signal sent by the transmitting device. Furthermore, the sensor may be a time sensor, or a detector for an external physical quantity, and may control the actuator by means of a control unit.

Through the sensors it is possible to control the actuator without depending on any energy. For example, the frequency detector may be a selective resonant circuit, which trips the actuator only if the energy signal is transmitted on a defined frequency. The voltage-value detector may be adjusted to the amount of a defined voltage. This defined voltage may be due to a peak voltage of the signal transmitted by the transmitting device to the receiving device, or to a voltage occurring when the temporary energy storage is changed.

In addition, an internal timer can also be used to trip the action only if the energy signal is available for a predetermined period of time. Furthermore, detectors can be used to activate the system based upon temperature, pressure, sound levels, brightness, acceleration etc.

The receiving device may comprise a logic element or a processor circuit designed to evaluate or interpret remote control signals of the transmitting device. In addition, the receiving device may comprise a decoder which evaluates authentication data transmitted by the transmitting device and releases the actuator if the authentication data is valid.

This measure relocates an additional safety test into the receiving device. It is possible to individually limit the control possibilities of the receiving devices. This is useful, for example when there are a plurality of receiving devices and persons with different authorizations are involved. Authorized persons with low authorization status can then remotely control only defined receiving devices whereas authorized persons with a higher authorization status can influence a plurality of receiving devices.

The receiving device may include a separate data transmitter and the transmitting device a separate data receiver for bi-directional communication. Authentication data can be stored in both the memory of the transmitting device, and the memory of the receiving device. Decoders can be used in both the transmitting device and the receiving device. In this case, authentication data can be mutually transmitted upon request and tested for their validity. The sensor and the acting element are releasable only if both the authentication or verification data are valid.

Security against tampering or manipulation is also improved by this design. The unknown code employed in the data transmission makes it very hard to decipher. In addition, verification activities can be stored in the memory unit of the transmitting device or the receiving device. Protocols of all authentication activities are automatically generated to uncover misuse or irregularities at a later time.

According to another advantageous embodiment of the invention, the energy required to feed the sensor and the actuator is transmitted to the receiving device simultaneously with a data transmission, or with bi-directional data communication between the transmitting device and the receiving device. Alternatively, energy transmission may be controllable so that only the energy required for data transmission is transmitted first from the transmitting device to the receiving device. In addition, the energy required for tripping an action is only subsequently requested by the receiving device and transmitted by the transmitting device to the receiving device.

In the first alternative, use is made in the verification time to transmit energy to feed the acting element or the sensor. The overall transmission time can be reduced so that the reaction time of the sensor and the acting element can be improved.

The other embodiment of the invention supports a longer reaction or response time because the energy requested is only upon the validity of the authentication. In this design, there is a superior exploitation of energy since the energy requirement is significantly higher to move an actuator than for pure data communication. As a rule, the energy is saved at each time of authentication or verification is negative. In connection with battery operated transmitting devices, this leads to an increased (prolonged) duration of the operating time if the validity rate in the authentication process is low.

The receiving device may use a separate temporary energy storage for the actuator, the sensor, the decoder, the logic element, the processor circuit, and the control unit. Separate energy storage are beneficial because the remaining circuits consume less energy, require only a small energy storage and can start to operate more quickly because the required supply voltage is obtained more rapidly. In addition, the operation of such circuits is not influenced even if the energy storage of the actuator was discharged due to execution of the actuator.

In one embodiment, the actuator is designed as a lock or door opener. Thus, the receiver may save having to use a mechanical lock or, the additional electronic lock may insure against failure of the lock due to environmental causes such as contamination or freezing.

The actuator can be used in many different applications. For example, the actuator can be used as a lock or opener in connection with a door of a vehicle, a land lot, a building, a freight container, the cover of a box for valuables, or with a collection container for valuable materials or wastes. In this case, there is an advantage similar to a mechanical lock, where there is no energy required. In addition, this design eliminates damage to the lock and loss of keys, and there is also increased security.

This invention can also be applied to small lockable collection containers that contain valuable materials. In this case, individual users can open the collection container by means of separate keys, but which generally have to be opened when transported on a collection vehicle. In addition, it is possible to distinguish between different types of small containers through the use of an additionally adjustable code. This code is transmitted together with an energy signal by the transmitting device mounted on the collecting vehicle and compared within the associated receiving device with a stored code. In this way, the transmitting device can select which container it desires to open.

Another use of the invention is for cashboxes wherein users are provided with individual keys. However, the financial institution or bank has to use a master key which has a general locking and unlocking function via an electronic actuator.

BRIEF DESCRIPTION OF THE DRAWINGS

Other objects and features of the present invention will become apparent from the following detailed description considered in connection with the accompanying drawings which disclose the embodiments of the present invention. It should be understood, however, that the drawings are designed for the purpose of illustration only and not as a definition of the limits of the invention.

In the drawings, wherein similar reference characters denote similar elements throughout the several views.

DESCRIPTION OF THE PREFERRED EMBODIMENTS

Figure 1:
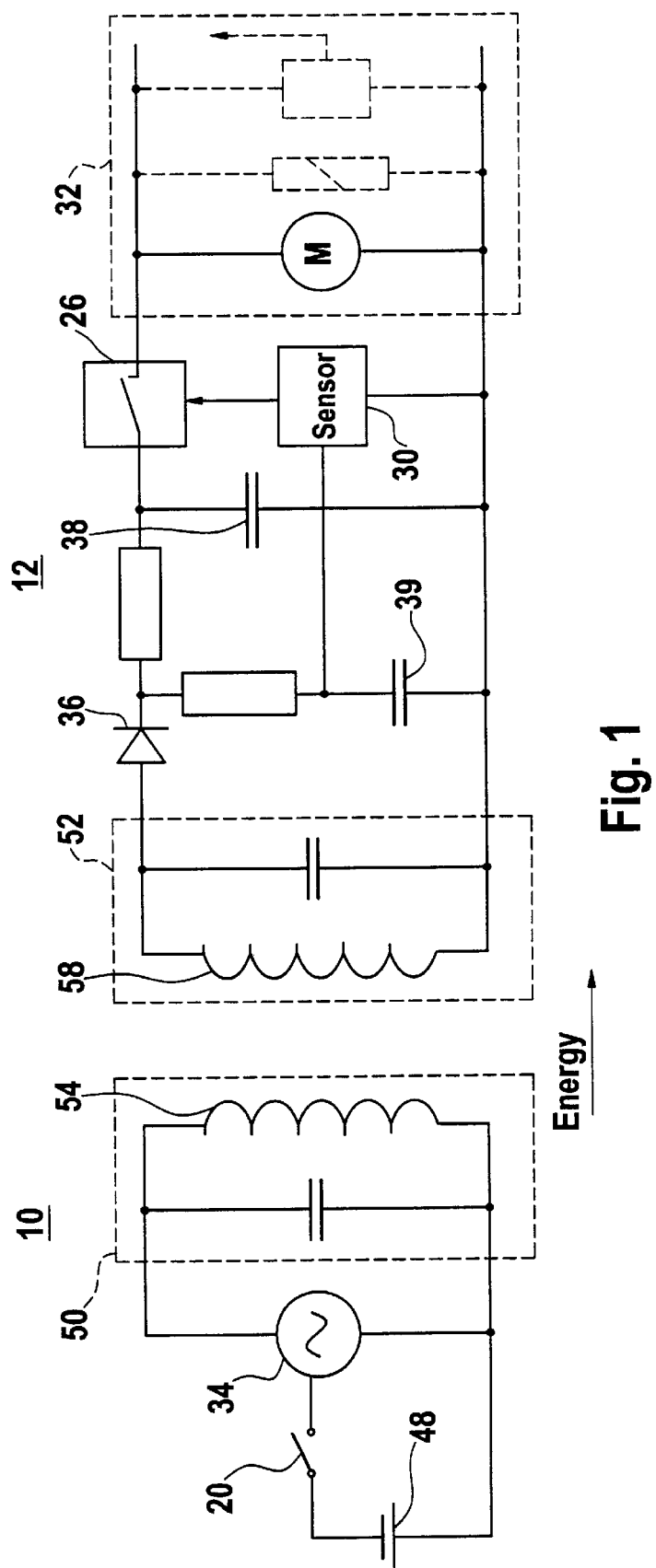
FIG. 1 shows a basic circuit diagram of the invention including both the transmitting device and the receiving device according to the invention.

FIG. 1 shows a transmitting device for wireless energy transmission that includes a transmitter 10 and a receiver 12. The transmitting device is used for a high frequency generator serving as an energy transmitter 34 and a resonant circuit 50 whose coil 54 serves as an antenna. Transmitting device 10 has its own energy source 48, which may be connected to energy transmitter 34 by means of control unit 20 which may be a switch or a key.

Receiving device 12 is located adjacent to transmitting device 10 and comprises a resonant circuit 52 tuned to the same frequency, and using coil 58 as well. An energy receiver 36 can be used in the form of a rectifier as well as a temporary energy storage for elements 38 and 39, in the form of capacitors. These capacitors are connected downstream of resonant circuit 52 of receiving device 12. The energy storage elements or capacitors are chargeable via charging resistances. One larger capacitor serves as an energy storage 38 for an actuator 32 whereas the smaller capacitor serves as an energy storage element for an electronic circuit, which is represented by sensor 30.

Sensor 30 may be a voltage sensor with a comparator and a reference. Sensor 30 acts on a control input of a control unit 26, which comprises a switching transistor, or a thyristor, and which connects an acting element 32 to temporary energy storage element 38. Acting element 32 may be, for example an electromagnet, a motor, or also another transmitter. Due to the separate embodiment of energy storages 38 and 39 in actuator 32 and for sensor 30, energy storage 39 can be designed for smaller capacity and therefore charged at a quicker rate. Sensor 30 is consequently ready for operation more quickly than if it would receive-its supply voltage from the same energy storage 38 as acting element 32. Furthermore, the operating voltage is still available even if energy storage 38 for actuator 32 is completely discharged when its switch is turned on.

However, the higher capacity of energy storage 38 for actuator 32 makes it possible to supply the switching current for the electromagnet or the start-up current for a motor even though this power peak would not be transmittable by wireless energy transmission.

Energy transmitter 34 could simultaneously transmit a data code, which is evaluated by a decoder of the receiving device and compared with a stored code. The actuator is then tripped only if the code corresponds.

Figure 2:
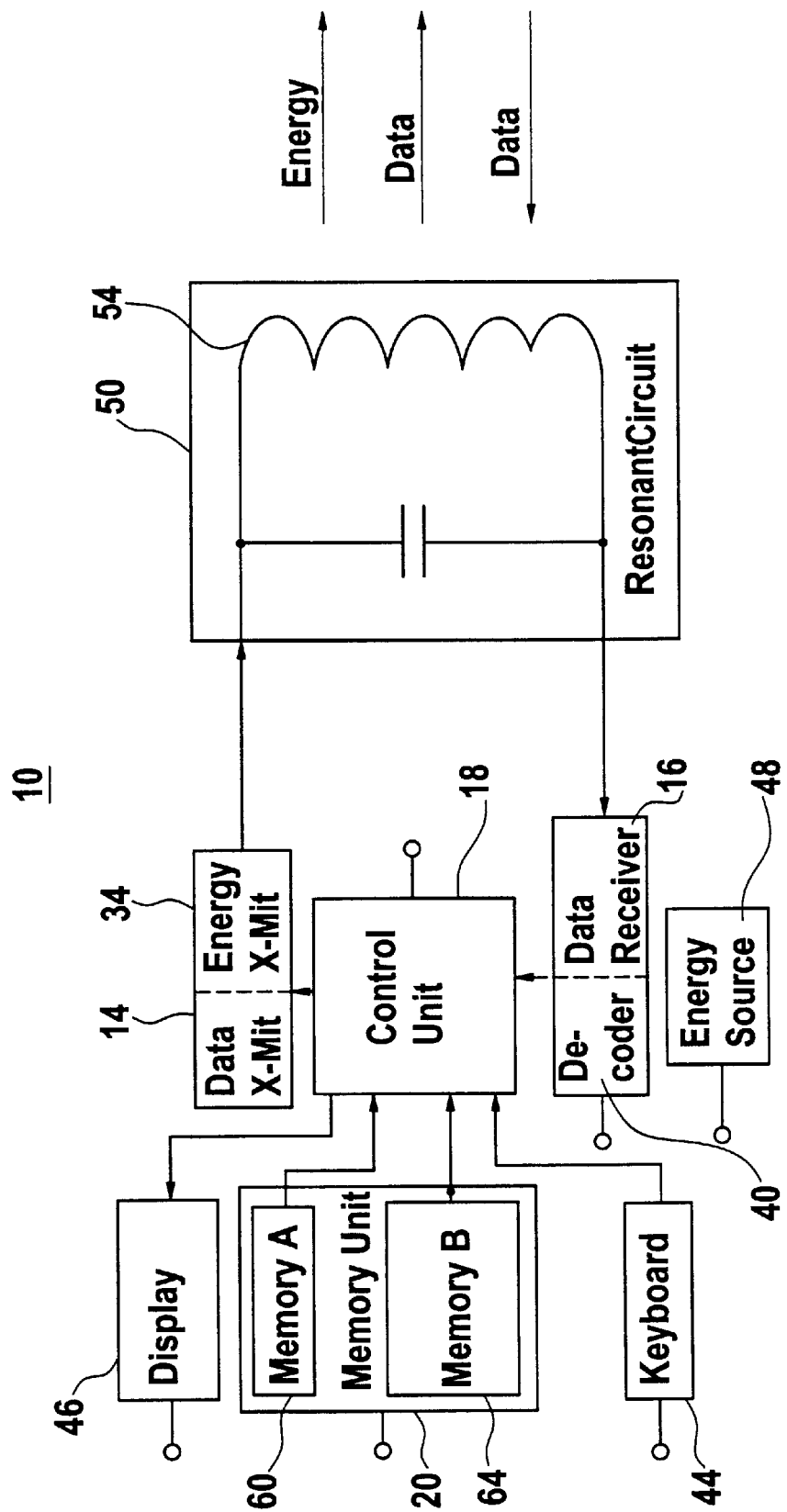
FIG. 2 is an electrical block diagram of the transmitting device of the invention.

FIG. 2 shows an expanded block diagram of a transmitting device. Transmitting device 10 comprises a high frequency generator, which serves as an energy transmitter 34 and a data transmitter 14. Furthermore, the receiving device comprises a data receiver, 16, a memory unit 20, a keyboard 44, a display 46, a control unit 18 an energy source 48, and a resonant circuit 50 having a coil 54 serving as an antenna. Resonant circuit 50 acts to transmit and receive information. Energy and data are transmitted via resonant circuit 50 to receiving device 12 and data originating from receiving circuit 12 are received via the circuit.

Data transmitter 14, and data receiver 16, memory unit 20 display 46, and keyboard 44 are controlled by control unit 18. Memory unit 20 is divided in a part or zone 60 which contains an exclusive identification number that can be saved over only once. This number is stored in part 60.

Figure 3:
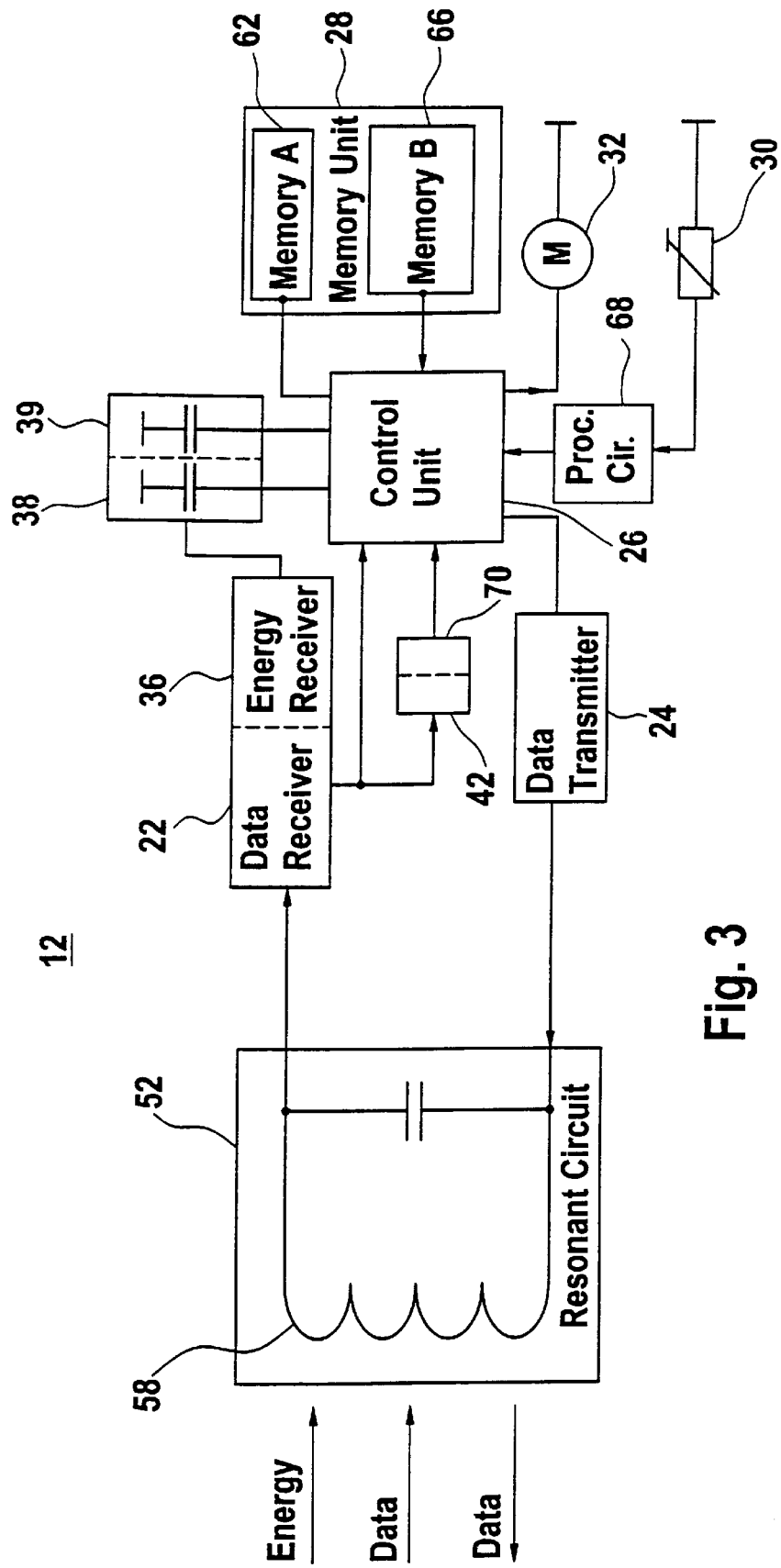
FIG. 3 is an electrical block diagram of the receiving device of the invention.

FIG. 3 shows an expanded block diagram of a receiving device 12. Receiving device 12 has functional blocks which are partly similar to those of transmitting device 10. For example, receiving device 12 also comprises a data transmitter, a data receiver, a memory unit 28, a control unit 26, and a resonant circuit 52 serving at the same time for transmitting and receiving with the coil 58 of the resonant circuit serving as an antenna. Receiving device 12 also contains energy receiver 36 and data receiver 22. Energy and data originating from transmitting device 10 are received via resonant circuit 52 and data are transmitted to transmitting device 10 via the resonant circuit.

Furthermore, receiving device 12 comprises an acting element 32 and a sensor 30. Acting element 32 can be controlled remotely from a transmitting device 10 and automatically by sensor 32. A processor circuit 70 associated with control unit 26 serves to evaluate remote controlled signals. To automatically control sensor signals, sensor 30 is connected to control unit 26 via a processor circuit 68 for evaluating the sensor signal.

To transmit energy through the two energy storages, 38 and 39 energy storage 38 with high capacity serves to supply the actuator 32 with energy, and energy storage 39 serves to supply the other circuit components with energy. The energy storage 39 is rapidly chargeable due to its low capacity, so that the receiving device 12 can be in operation very quickly by this low capacity energy storage.

Data transmitter 24, data receiver 22 and memory unit 28 are controlled by control unit 26. Furthermore, a decoder 42 is connected to data receiver 22 to test the validity of the data received associated with control unit 26. Memory unit 28 is divided into a memory B part 66 which can be saved over repeatedly into memory B part 62 which cannot be saved over repeatedly or saved over only once, with an exclusive identification number being stored in part 62.

To protect against tampering with unreleased transmitting devices, it is possible to proceed as follows:

First, there is an exchange of authentication or verification data between the receiving device 12 and the transmitting device 10. Exclusive identification numbers of the transmitting devices and the receiving devices are stored in memory parts 60 and 62 which can be saved on only once or not at all. These authentication numbers determine which transmitting devices and receiving devices are admitted as partners for mutual communication. The identification numbers of the transmitting and receiving devices are stored in memory parts 64 and 66. If transmitting device 10 is electromagnetically coupled to receiving device 12, the functional blocks of receiving device 12 are supplied with energy and start to operate, an exchange of authentication or verification data takes place first.

In a very secure process, transmitting device 10 and receiving device 12 transmit authentication data to each other. Next, this data is changed by a test algorithm and then transmitted back. Since the test algorithm is known to both devices, the validity of the authentication data can be checked, making it impossible for others to listen in or decipher the authentication data. The authentication data is changed with each new transmission. The test algorithm or check algorithm can be influenced by identification numbers. Memory unit 28, acting element 32 and sensor 30 are released by control unit 26 of receiving device 12 only after the devices have determined the validity of the authentication data.

There are containers for valuable materials or containers for residual waste whose lids or covers can be locked by means of a lock and opened only by the authorized user for disposal of the wastes.

It is possible to proceed with cashboxes wherein each user has an individual key. The bank has to be able to open all cashboxes in a simple and quick way without keys. In this case, a receiving device with an acting member is integrated in the cash box and the acting member is capable of bridging and releasing the regular lock. The bank has corresponding transmitting devices which are capable of transmitting the energy required for activating the acting element and for supplying the latter with energy.

Another application possibility is available to monitor the pressure of a tire in the tire of a vehicle. In this case, supplying energy from the power on board the vehicle is possible only under very complicated conditions. To help with temporary energy storage, the receiving device can detect the tire pressure over a longer period of time via a sensor, and when there is a pressure drop, a data transmitter is activated, which transmits an emergency "call" to the electronics of the vehicle. This emergency call can also be transmitted shortly before the energy of the temporary energy storage falls short of a lower threshold value and approaches complete exhaustion. The temporary energy storage can then be recharged from time to time.

Accordingly, while only a few embodiments of the present invention has been shown and described, it is to be understood that many changes and modifications may be made thereunto without departing from the spirit and scope of the invention as defined in the appended claims.

What is claimed is:

1. A device for RF energy transmission comprising:
   a transmitting device for transmitting data signals and energy;

a receiving device for receiving the data signals and energy; and an actuator coupled to said receiving device;

wherein the receiving device comprises:
- a sensor selected from the group consisting of a frequency detector, a voltage value detector, a time detector, and a detector for measuring external physical quantity, and
- a control unit responsive to said sensor for tripping said actuator;

wherein the energy required by said receiving device is wirelessly transmitted from said transmitting device to said receiving device;

wherein the energy required by said actuator is wirelessly transmitted from said transmitting device to said receiving device;

wherein tripping of said actuator is selectively controllable; and wherein the energy required to supply said actuator and said sensor is transmitted simultaneously with a data transmission and energy transmission required by said receiving device to said receiving device, or is transmitted after a time period in which a bi-directional data communication between said transmitting device and said receiving device occurs, provided that said data is authenticated or verified.

2. The device as claimed in claim 1, wherein said actuator is controlled by the transmitting device by remote control.

3. The device as claimed in claim 1, wherein at least one actuator is controlled within the receiving device by a sensor of the receiving device.

4. The device according to claim 1, wherein the data signal of said transmitting device includes a code that is compared to a code located in the receiving device before the actuator can be tripped.

5. The device according to claim 1, wherein said actuator is tripped upon authentication of data exchanged between the transmitting device and the receiving device.

6. The device according to claim 1, further comprising at least one temporary energy storage in the receiving device chargeable by energy transmitted from said transmitting device to said receiving device and supplying said actuator with energy required by the actuator during peak consumption, and wherein said actuator is tripped by a coded signal.

7. The device as claimed in claim 6, wherein the storage supplies said receiving device with energy during transmission breaks.

8. The device as claimed in claim 1, wherein the receiving device further comprises a logic circuit for evaluating the sensor signals.

9. The device according to claim 8, wherein the receiving device comprises a logic element or processor circuit for evaluating remotely controlled signals of the transmitter.

10. The device according to claim 9, wherein said receiving device further comprises a decoder for evaluating authentication data transmitted by said transmitting device wherein said decoder releases said actuator if said authentication data is valid.

11. The device according to claim 10, wherein said receiving device further comprises a separate data transmitter, and said transmitting device comprises a decoder and a separate data receiver for bi-directional communication, wherein said authentication data is stored in both a memory unit of said transmitting device and in a memory unit of said receiving device, said decoders of the transmitting and receiving devices controlling the evaluation of said authentication data exchanged between said transmitting device and said receiving device so that the validity of the transmitted data can be checked wherein said actuator is releasable only if the authentication data is valid.

12. The device as claimed in claim 11, wherein authentication activities are stored in a memory unit of said transmitting device and said receiving device.

13. The device according to claim 11 wherein said actuator and said sensor are releasable only if the authentication data is valid.

14. The device as claimed in claim 10, wherein the receiving device further comprises separate temporary energy storages for said actuator, said sensor, said decoder, said processor circuit, and said control unit.

15. The device according to claim 14, wherein said separate temporary energy storages comprise:
- a first energy source comprising a capacitor having a low capacitance for supplying power to said sensor, said decoder, said processor circuit, and said control unit; and
- a second energy source comprising a capacitor having a high capacitance for supplying power to said actuator.

16. The device according to claim 1, wherein the actuator is designed to form a lock or opener.

17. The device as claimed in claim 16, wherein said device serves to actuate the lock or opener of a door of a vehicle, lot or plot of land, building, container for goods or the cover of a cassette box for valuables, or a collection container for valuable materials or wastes.

18. The device according to claim 17, wherein the lock or opener is individually coded and the actuator serves to release the individually coded lock or opener as a master key.

19. The device according to claim 1, further comprising a plurality of actuators for executing an action wherein tripping of said action is controlled by each actuator.

* * * * *

UNITED STATES PATENT AND TRADEMARK OFFICE
CERTIFICATE OF CORRECTION

PATENT NO.    : 6,275,143 B1
DATED         : August 14, 2001
INVENTOR(S)   : Anatoli Stobbe It is certified that error appears in the above-identified patent and that said Letters Patent is hereby corrected as shown below:

<u>Title page,</u>
Please insert item [30] as follows:
-- [30]  Foreign Application Priority Data
       May 9, 1997  (DE) ................ 197 19 562.8
       April 22, 1998  (EP) ............... 98 107 287.9 --.

Signed and Sealed this

Twenty-first Day of January, 2003

JAMES E. ROGAN
*Director of the United States Patent and Trademark Office*